(12) United States Patent
Yang et al.

(10) Patent No.: US 12,313,551 B2
(45) Date of Patent: May 27, 2025

(54) COHERENT RAMAN SPECTRO-MICROSCOPY SYSTEM AND METHOD THEREOF

(71) Applicant: NATIONAL TSING HUA UNIVERSITY, Hsinchu (TW)

(72) Inventors: Shang-Da Yang, Hsinchu (TW); Chih-Hsuan Lu, Pingtung County (TW); Bo-Han Chen, Taichung (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 197 days.

(21) Appl. No.: 18/155,754

(22) Filed: Jan. 18, 2023

(65) Prior Publication Data

US 2024/0110875 A1    Apr. 4, 2024

(30) Foreign Application Priority Data

Sep. 30, 2022   (TW) .................................. 111137273

(51) Int. Cl.
    *G01N 21/65*   (2006.01)
    *G01J 3/44*    (2006.01)
    *G02F 1/35*    (2006.01)

(52) U.S. Cl.
    CPC .............. *G01N 21/65* (2013.01); *G01J 3/44* (2013.01); *G01J 3/4412* (2013.01); *G02F 1/3528* (2021.01); *G01N 2021/653* (2013.01)

(58) Field of Classification Search
    CPC .......... G01J 3/44; G01J 3/4412; G01N 21/65; G01N 21/658; G01N 2021/651;
    (Continued)

(56) References Cited

U.S. PATENT DOCUMENTS 7,821,633 B2 *  10/2010  Jalali .................... G01J 3/4412
                                                356/73.1
8,446,580 B2    5/2013   Politecnico
(Continued)

FOREIGN PATENT DOCUMENTS

CN    107991270 A    5/2018
CN    108240979 A    7/2018
(Continued)

OTHER PUBLICATIONS

Pei-Chen Lai et al., "Coherent Raman imaging by using a supercontinuum light source", 2022 Annual Meeting of the Physical Society of Taiwan, dated on Jan. 24-26, 2022, Poster Presentation, Taiwan, R.O.C.

(Continued)

*Primary Examiner* — Gordon J Stock, Jr.
(74) *Attorney, Agent, or Firm* — CKC & Partners Co., LLC

(57) ABSTRACT

A coherent Raman spectro-microscopy system is configured for generating a spectro-microscopic image of a sample and includes a light source, a supercontinuum spectrum generator, a color filter assembly, and a spectro-microscopic assembly. The light source is for emitting at least one pulsed laser beam. The supercontinuum spectrum generator is for broadening the bandwidth of at least one pulsed laser beam. The color filter assembly is for filtering the bandwidth of at least one pulsed laser beam according to a predetermined bandwidth and converting at least one pulsed laser beam into a coherent spectro-microscopic laser beam. The sample is disposed in the spectro-microscopic assembly, and the spectro-microscopic assembly receives the coherent spectro-microscopic laser beam so that the coherent spectro-microscopic laser beam passes through the sample to generate the spectro-microscopic image of the sample.

17 Claims, 7 Drawing Sheets

(58) Field of Classification Search
CPC ....... G01N 2021/653; G01N 2021/655; G01N 2021/656; G02F 1/3528
See application file for complete search history.

(56) References Cited

U.S. PATENT DOCUMENTS

| | | | |
|---|---|---|---|
| 9,581,497 B2* | 2/2017 | Mikami | G01J 3/44 |
| 2012/0287428 A1* | 11/2012 | Tamada | G02B 21/16 |
| | | | 356/301 |
| 2014/0268131 A1* | 9/2014 | Tamada | G01J 3/0218 |
| | | | 356/301 |
| 2015/0369742 A1* | 12/2015 | Tamada | G01N 21/65 |
| | | | 356/301 |
| 2022/0035172 A1* | 2/2022 | Yang | G02F 1/37 |

FOREIGN PATENT DOCUMENTS

| | | |
|---|---|---|
| EP | 1278092 B1 | 9/2009 |
| TW | 202207559 A | 2/2022 |

OTHER PUBLICATIONS

Yu-Chen Cheng et al., "Supercontinuum generation in a multi-plate medium", Optics Express, published on Mar. 25, 2016, vol. 24, issue 7, pp. 7224-7231, published by Optical Society of America, United States.

Chih-Hsuan Lu et al., "Generation of intense supercontinuum in condensed media", Optica, published on Dec. 10, 2014, vol. 1, issue 6, pp. 400-406, published by Optical Society of America, United States.

Bo-Han Chen et al., "Double-Pass Multiple-Plate Continuum for High-Temporal-Contrast Nonlinear Pulse Compression", Frontiers in Photonics, published on Jul. 25, 2022, vol. 3, article 937622, pp. 1-6, published by Frontiers Media S.A., Switzerland.

Guan-Jie Huang et al., "Towards stimulated Raman scattering spectro-microscopy across the entire Raman active region using a multiple-plate continuum", Optics Express, published on Oct. 6, 2022, vol. 30, issue 21, pp. 38975-38983, published by Optical Society of America, United States.

* cited by examiner

COHERENT RAMAN SPECTRO-MICROSCOPY SYSTEM AND METHOD THEREOF

RELATED APPLICATIONS

This application claims priority to Taiwan Application Serial Number 111137273, filed Sep. 30, 2022, which is herein incorporated by reference.

BACKGROUND

Technical Field

The present disclosure relates to a spectro-microscopy system and a method thereof. More particularly, the present disclosure relates to a coherent Raman spectro-microscopy system and a method thereof which measures the sample by Raman scattering.

Description of Related Art

With the advance of technology, the needs for the accuracy of semiconductor inspection, material analysis, and biomedical imaging arise gradually, and the coherent Raman spectro-microscopy technology based on Raman scattering has been widely used in recent years. In the coherent Raman spectro-microscopy system, it is required to temporally and spatially overlap the two short pulsed laser beams with different central wavelengths whose frequency difference should match a specific Raman shift of targeted molecules of a measured sample. In the conventional coherent Raman spectro-microscopy system, the practitioners achieve a wavelength-tunable short pulsed laser light source via an optical parametric oscillator (OPO) or an optical parametric amplifier (OPA) driven by a fixed wavelength pulsed laser light source. However, when tuning the wavelengths via the optical parametric oscillator or the optical parametric amplifier, the minimum frequency difference between the two laser beams (thus, the accessible Raman shift) is hard to be less than 1000 $cm^{-1}$ because of degenerate optical parametric amplification. Moreover, because the wavelengths of the optical parametric oscillator or the optical parametric amplifier are tuned by temperature or orientation angle of the crystal, the tuning process is slow and the bandwidth cannot be adjusted according to the requirements of the sample in real time. The complicated structure and long beam paths of the conventional light source also undermine the stability of measurement. By the configuration of tuning the wavelength of a single laser beam, the sample may not be measurable whenever one of the two wavelengths has strong absorption. Furthermore, the conventional coherent Raman spectro-microscopy system has low sensitivity and poor specificity for the lack of electronic pre-resonance (EPR) and can only address one Raman shift over a finite range at one time, respectively.

Accordingly, a coherent Raman spectro-microscopy system which can rapidly adjust wavelength and bandwidth according to the sample and has improved stability, sensitivity, specificity of measurement is still a highly desirable goal for the industry.

SUMMARY

According to one aspect of the present disclosure, a coherent Raman spectro-microscopy system is configured for generating a spectro-microscopic image of a sample and includes a light source, a supercontinuum spectrum generator, a color filter assembly and a spectro-microscopic assembly. The light source is for emitting at least one pulsed laser beam. The supercontinuum spectrum generator is for broadening a bandwidth of the at least one pulsed laser beam. The color filter assembly is for filtering the bandwidth of the at least one pulsed laser beam according to a predetermined bandwidth and converting the at least one pulsed laser beam into a coherent spectro-microscopic laser beam. The sample is disposed in the spectro-microscopic assembly, and the spectro-microscopic assembly receives the coherent spectro-microscopic laser beam so that the coherent spectro-microscopic laser beam passes through the sample to generate the spectro-microscopic image of the sample.

According to one aspect of the present disclosure, a coherent Raman spectro-microscopy method is configured for generating a spectro-microscopic image of a sample and includes a light source providing step, a supercontinuum spectrum generating step, a color filtering step, and a spectro-microscopic step. The light source providing step is performed to provide at least one pulsed laser beam. The supercontinuum spectrum generating step is performed to broaden a bandwidth of the at least one pulsed laser beam. The color filtering step is performed to filter the bandwidth of the at least one pulsed laser beam according to a predetermined bandwidth and to convert the at least one pulsed laser beam into a coherent spectro-microscopic laser beam. The spectro-microscopic step is performed to guide the coherent spectro-microscopic laser beam through the sample and to generate the spectro-microscopic image of the sample.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
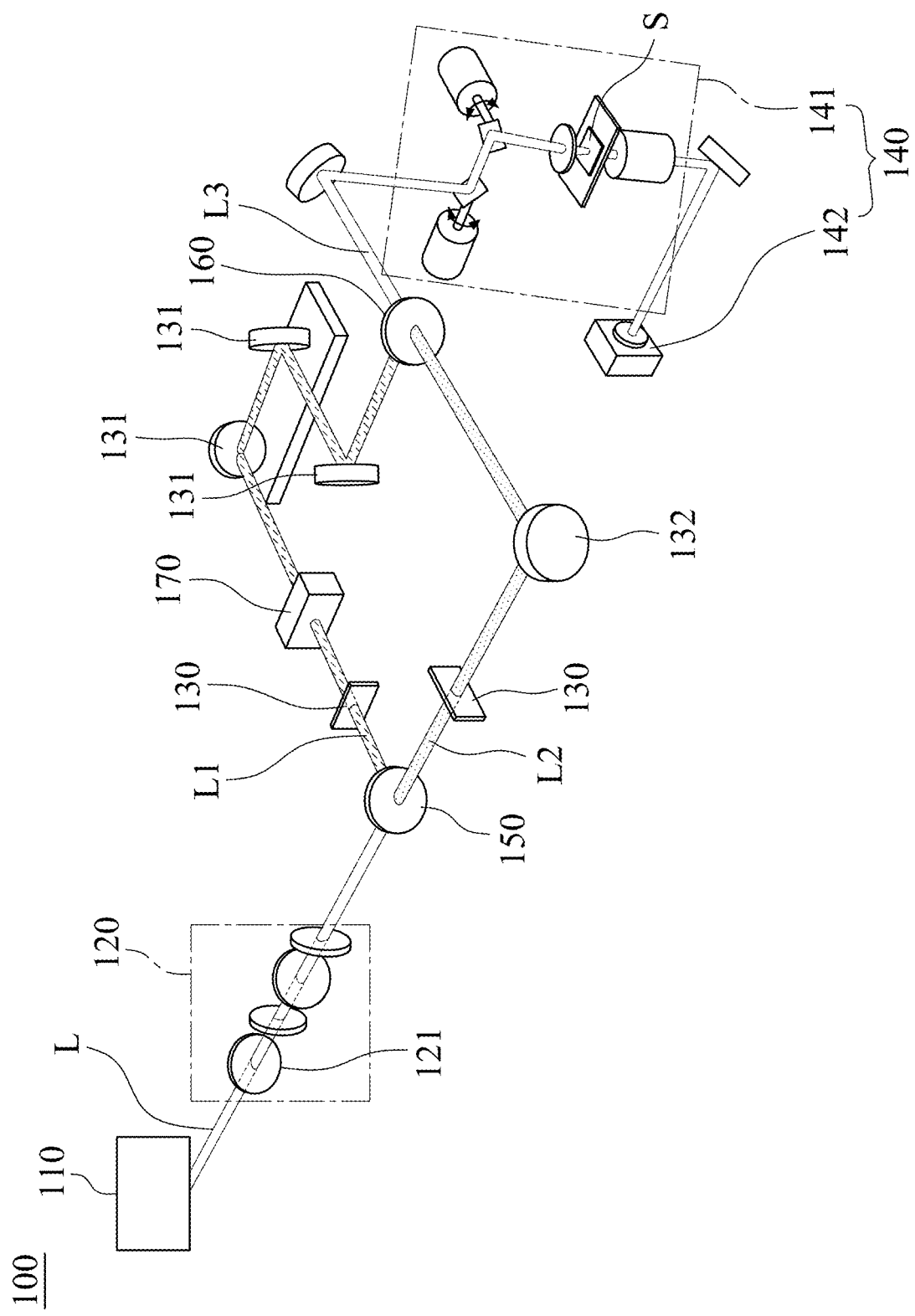
FIG. 1 shows a schematic view of a coherent Raman spectro-microscopy system according to the 1st embodiment of the present disclosure.

FIG. 1 shows a schematic view of a coherent Raman spectro-microscopy system 100 according to the 1st embodiment of the present disclosure. As shown in FIG. 1, in the 1st embodiment, the coherent Raman spectro-microscopy system 100 is configured for generating a spectro-microscopic image of a sample S, and includes a light source 110, a supercontinuum spectrum generator 120, a color filter assembly (its numeral reference is omitted) and a spectro-microscopic assembly 140. The light source 110 is for emitting at least one pulsed laser beam L. The supercontinuum spectrum generator 120 is for broadening a bandwidth of the pulsed laser beam L. The color filter assembly is for filtering the bandwidth of the pulsed laser beam L according to a predetermined bandwidth and converting the pulsed laser beam L into a coherent spectro-microscopic laser beam L3. Specifically, the pulsed laser beam L filtered by the color filter assembly can be split into a Stokes laser beam L1 and a pumping laser beam L2, and then the Stokes laser beam L1 and the pumping laser beam L2 are filtered and recombined into the coherent spectro-microscopic laser beam L3, but the present disclosure is not limited thereto. The sample S is disposed in the spectro-microscopic assembly 140, and the spectro-microscopic assembly 140 receives the coherent spectro-microscopic laser beam L3 so that the coherent spectro-microscopic laser beam L3 passes through the sample S to generate the spectro-microscopic image of the sample S. Via the configuration of the color filter assembly, the central wavelength and the bandwidth of the pulsed laser beam L broadened by the supercontinuum spectrum generator 120 can be filtered according to the molecular fingerprint of the sample S so that the difficulty of adjusting the central wavelength and the bandwidth can be decreased to improve the stability and the sensitivity of measuring the sample S by the coherent Raman spectro-microscopy system 100 and the specificity of the coherent Raman spectro-microscopy system 100. The detail of the coherent Raman spectro-microscopy system 100 is described in the following.

As shown in FIG. 1, a pulse duration of the pulsed laser beam L emitted by the light source 110 can be less than one picosecond, and the light source 110 can be a Titanium (Ti):Sapphire femtosecond laser light source, a Ytterbium (Yb)-based femtosecond laser light source or a Holmium (Ho)-based femtosecond laser light source. In the 1st embodiment, the light source 110 is an Yb-based femtosecond laser light source, and the number of the pulsed laser beam is one, but the present disclosure is not limited thereto. Moreover, the supercontinuum spectrum generator 120 can include a plurality of broadening plates 121. The broadening plates 121 are arranged in order along the optical path of the pulsed laser beam L, and the broadening plates 121 broaden the bandwidth of the pulsed laser beam L sequentially. By utilizing the material property of the broadening plates 121, the damage of a conventional bulk material caused by the self-focusing effect during the process of broadening the pulsed laser beam L can be avoided. The thickness of each of the broadening plates 121 can be less than 1 mm. When the pulsed laser beam L is self-focused in one of the broadening plates 121 and approaches the damage threshold, the pulsed laser beam L exits one of the broadening plates 121, and then diverges and enters the next one of the broadening plates 121 to continue broadening the pulsed laser beam L. Therefore, the bandwidth of the pulsed laser beam L can be wide enough to meet the requirement of measuring the sample S. In detail, the energy density of the pulsed laser beam L after broadening is at least higher than 1 nJ/nm, which is as much as hundreds of times of 1-10 pJ/nm compared with the energy density of the pulsed laser beam broadened by the conventional bulk material, and the energy density of the pulsed laser beam L is enough to be provided for the coherent Raman spectro-microscopy system 100 to capture the non-linear image of the sample S. Furthermore, the number of the broadening plates 121 can be at least two. In the 1st embodiment, a number of the broadening plates 121 is four. Hence, the number and the thicknesses of the broadening plates 121 can be adjusted according to the initial conditions of the pulsed laser beam L to meet the requirement of the bandwidth for the following measurement.

Furthermore, the color filter assembly can include a beam splitter 150, at least one color filter 130, and a light recombining element 160. The beam splitter 150 is for splitting the pulsed laser beam L into the Stokes laser beam L1 and the pumping laser beam L2, and the color filter 130 filters a bandwidth of at least one of the Stokes laser beam L1 and the pumping laser beam L2. Specifically, according to a predetermined wavelength, the beam splitter 150 splits the pulsed laser beam L into the Stokes laser beam L1 with wavelengths longer than the predetermined wavelength and the pumping laser beam L2 with wavelengths shorter than the predetermined wavelength. In the 1st embodiment, the beam splitter 150 is a dichroic mirror and splits the pulsed laser beam L around the central wavelength 850 nm, the pulsed laser beam L with wavelengths longer than the wavelength 850 nm is reflected by the beam splitter 150 to form the Stokes laser beam L1, and the pulsed laser beam L with wavelengths shorter than the wavelength 850 nm passes through the beam splitter 150 to form the pumping laser beam L2. The light recombining element 160 is disposed between the beam splitter 150 and the spectro-microscopic assembly 140, and the light recombining element 160 is for recombining the Stokes laser beam L1 and the pumping laser beam L2 into the coherent spectro-microscopic laser beam L3. The coherent spectro-microscopic laser beam L3 passes through the sample S, and the spectro-microscopic assembly 140 generates the spectro-microscopic image of the sample S. Specifically, the number of the color filter 130 is two, and each of the two color filters 130 can be a tunable filter, a determined frequency color filter, a dichroic mirror, or a 4f pulse shaper, but the present disclosure is not limited thereto. The two color filters 130 filter a bandwidth of the Stokes laser beam L1 and a bandwidth of the pumping laser beam L2, respectively. By filtering the bandwidths of the Stokes laser beam L1 and the pumping laser beam L2 with the color filters 130, a minimum frequency difference between the Stokes laser beam L1 and the pumping laser beam L2 can be less than 1000 $cm^{-1}$ to improve the convenience of adjusting the bandwidth. Hence, the wavelength of the Stokes laser beam L1 and the wavelength of the pumping laser beam L2 can be adjusted according to the Raman shift of the molecules in the sample S so as to improve the stability of measurement. In other embodiments, the light splitter can be a beam splitter and split the pulsed laser beam into the Stokes laser beam and the pumping laser beam with the same bandwidth but half the intensity of the pulsed laser beam, and then the Stokes laser beam and the pumping laser beam can be filtered according to a first predetermined band and a second predetermined band by the two color filters, respectively, but the present disclosure is not limited thereto. Compared with the conventional Stokes laser beam and pumping laser beam, in present disclosure, both of the Stokes laser beam and pumping laser beam are filtered to satisfy a specific central frequency difference.

Moreover, the coherent Raman spectro-microscopy system 100 can further include an acousto-optic modulator 170. The acousto-optic modulator 170 modulates the intensity of the Stokes laser beam L1 according to a predetermined modulation frequency and extracts the pumping laser beam L2 according to the predetermined modulation frequency. Or, the acousto-optic modulator 170 modulates the intensity of the pumping laser beam L2 and extracts the Stokes laser beam L1 according to the other predetermined modulation frequency. Hence, the interference of environmental noise can be suppressed to improve the accuracy of measuring the sample S. In other embodiments, the coherent Raman spectro-microscopy system can further include an electro-optic modulator or a chopper for modulating the intensity of the Stokes laser beam and then extracting the pumping laser beam according to the predetermined modulation frequency, but the present disclosure is not limited thereto.

In the 1st embodiment, the coherent Raman spectro-microscopy system 100 can further include a plurality of reflecting mirrors 131 and a reflecting mirror 132. The reflecting mirrors 131 are disposed between the acousto-optic modulator 170 and the light recombining element 160, and for folding an optical path of the Stokes laser beam L1. The reflecting mirror 132 is disposed between one of the two color filters 130 which filters the pumping laser beam L2 and the light recombining element 160, and for folding an optical path of the pumping laser beam L2. Via the configuration of the reflecting mirrors 131 and the reflecting mirror 132, the optical path length of the Stokes laser beam L1 can be increased for time-delaying of the Stokes laser beam L1. When the Stokes laser beam L1 intersects with the pumping laser beam L2 at the light recombining element 160, the Stokes laser beam L1 and the pumping laser beam L2 can be recombined collinearly and overlapped both in time and space to form the coherent spectro-microscopic laser beam L3.

The spectro-microscopic assembly 140 can include a spectro-microscopic lens assembly 141 and a photodiode 142. The sample S is disposed in the spectro-microscopic lens assembly 141, and the spectro-microscopic lens assembly 141 receives the coherent spectro-microscopic laser beam L3 so that the coherent spectro-microscopic laser beam L3 passes through the sample S. The photodiode 142 converts optical signals carried in the coherent spectro-microscopic laser beam L3 into electronic signals to display the spectro-microscopic image of the sample S on an electronic device. In detail, the spectro-microscopic lens assembly 141 includes a galvanometer mirror assembly (its numeral reference is omitted) for adjusting the optical path of the coherent spectro-microscopic laser beam L3 through the sample S with different incident angles to capture the complete image of the sample S. Because the galvanometer mirror assembly is not the major feature of the present disclosure, the detail is not described herein.

Figure 2:
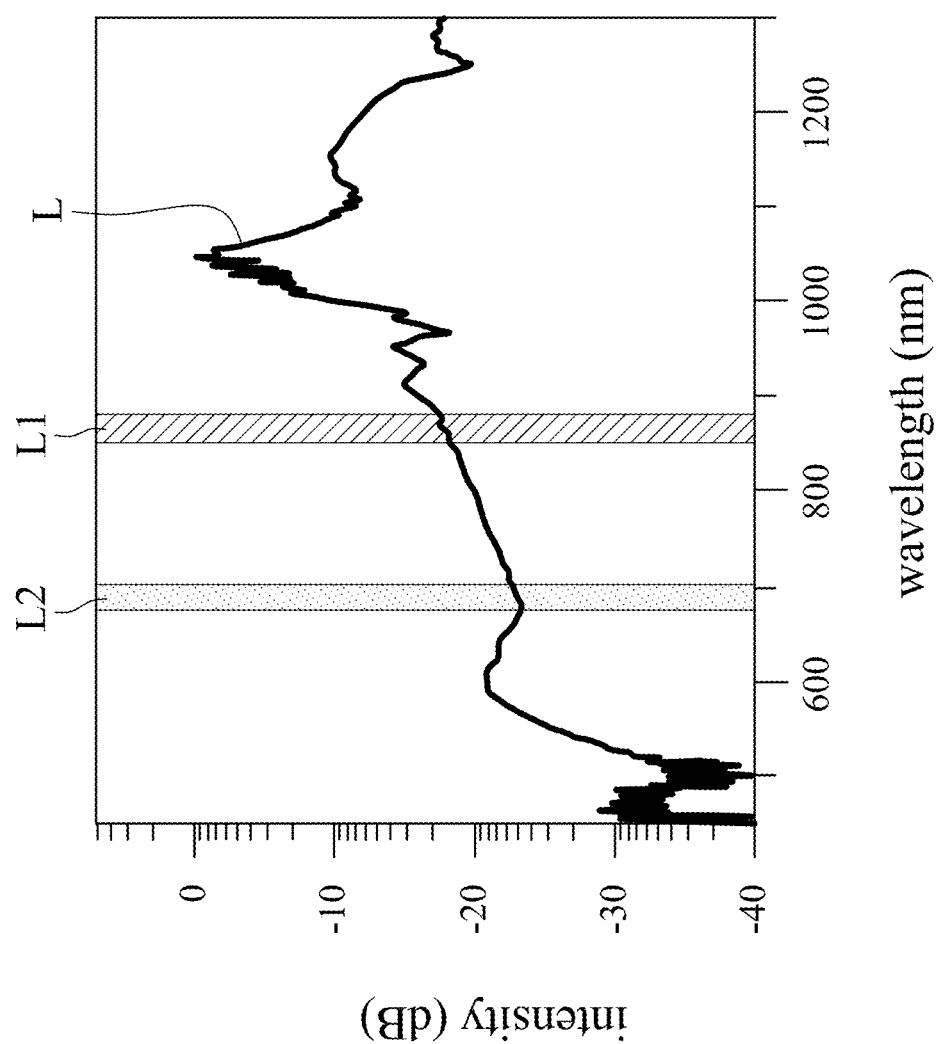
FIG. 2 shows a schematic view of a relation between the intensity and the wavelength of the pulsed laser beam broadened by the supercontinuum spectrum generator according to the 1st embodiment in FIG. 1.

FIG. 2 shows a schematic view of a relation between the intensity and the wavelength of the pulsed laser beam L broadened by the supercontinuum spectrum generator 120 according to the 1st embodiment in FIG. 1. As shown in FIG. 2, the bandwidth of the pulsed laser beam L before being broadened is 1025 nm-1035 nm, and the bandwidth of the pulsed laser beam L broadened by the supercontinuum spectrum generator 120 is 550 nm-1300 nm. Moreover, the color filters 130 filter the Stokes laser beam L1 and the pumping laser beam L2 at central wavelengths 703 nm and 880 nm, respectively.

It is worthy to mention that, in other embodiments, the number of the pulsed laser beam emitted by the light source can be plural, the bandwidth of each of the pulsed laser beams can be broadened by the supercontinuum spectrum generator and filtered by the color filter to form the Stokes laser beams and the pumping laser beams for measuring the sample in the Raman spectro-microscopy technology, but the present disclosure is not limited to the aforementioned number of the pulsed laser beam.

Figure 3:
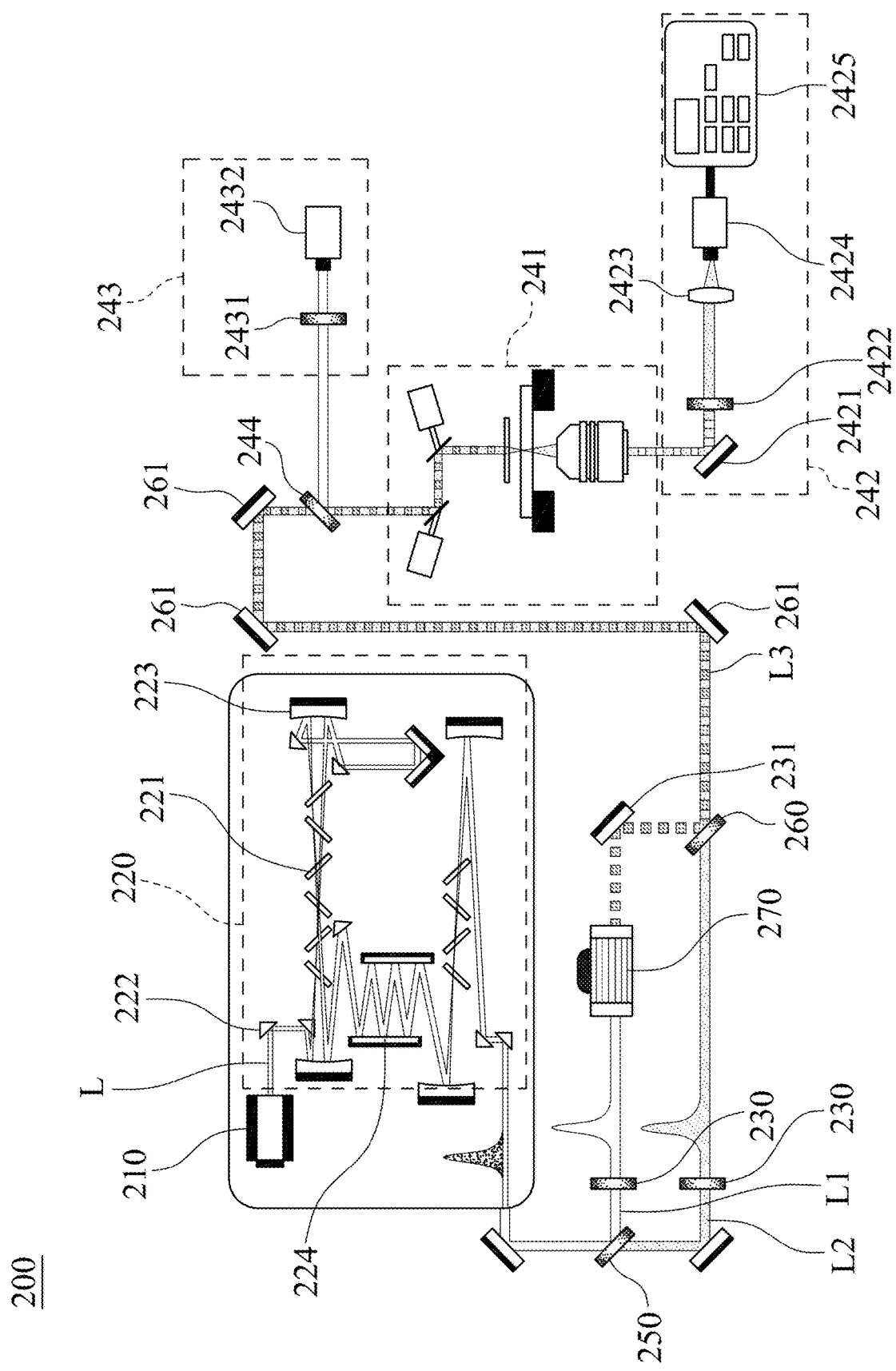
FIG. 3 shows a schematic view of a coherent Raman spectro-microscopy system according to the 2nd embodiment of the present disclosure.

FIG. 3 shows a schematic view of a coherent Raman spectro-microscopy system 200 according to the 2nd embodiment of the present disclosure. As shown in FIG. 3, the coherent Raman spectro-microscopy system 200 is configured for generating a spectro-microscopic image of a sample S, and includes a light source 210, a supercontinuum spectrum generator 220, a beam splitter 250, a color filter assembly and a spectro-microscopic assembly (its numeral reference is omitted). The color filter assembly includes two color filters 230, an acousto-optic modulator 270, a reflecting mirror 231, a light recombining element 260, and a plurality of optical path folding elements 261. Structures and configurations of the light source 210, the beam splitter 250, the color filters 230, the acousto-optic modulator 270, and the light recombining element 260 in the 2nd embodiment are the same as the structures and the configurations of the light source 110, the beam splitter 150, the color filters 130, the acousto-optic modulator 170 and the light recombining element 160 in the 1st embodiment, and the details will not be described herein again.

As shown in FIG. 3, in the 2nd embodiment, the supercontinuum spectrum generator 220 can include a plurality of broadening plates 221, a plurality of reflecting prism mirrors 222, a plurality of focusing elements 223, and a plurality of flat mirrors 224. The broadening plates 221 are arranged in order along the optical path of a pulsed laser beam L and broaden the bandwidth of the pulsed laser beam L sequentially. The broadening plates 221 are disposed between the focusing elements 223, and the focusing elements 223 are for focusing the pulsed laser beam L. Specifically, the optical path of the pulsed laser beam L can be folded by the reflecting prism mirrors 222, the focusing elements 223 and the flat mirrors 224 such that the optical path of the pulsed laser beam L can pass through the broadening plates 221 repeatedly to increase the number of times of broadening laser beam. In detail, the number of the broadening plates 221 is ten, six of the broadening plates 221 are disposed between two of the focusing elements 223, and the other four of the broadening plates 221 are disposed between the other two of the focusing elements 223. As shown in FIG. 3, after the pulsed laser beam L passes through the aforementioned six of the broadening plates 221 along a forward direction, the optical path of the pulsed laser beam L is folded by the reflecting prism mirrors 222 and the flat mirrors 224 to pass through the aforementioned six of the broadening plates 221 along a direction opposite to the forward direction so as to increase the number of broadening times and reduce the space usage of the supercontinuum spectrum generator 220, but the present disclosure is not limited to the aforementioned amounts and configurations. Therefore, the bandwidth of the pulsed laser beam L broadened by the supercontinuum spectrum generator 220 can be increased. In the 2nd embodiment, the bandwidth of the pulsed laser beam L before being broadened is 1025 nm-1035 nm, and the bandwidth of the pulsed laser beam L broadened by the supercontinuum spectrum generator 220 is 550 nm-1300 nm.

Moreover, the number of the reflecting mirror 231 is one, and the reflecting mirror 231 is for increasing an optical path length of the Stokes laser beam L1. Hence, when the Stokes laser beam L1 intersects with a pumping laser beam L2 at the light recombining element 260, the Stokes laser beam L1 and the pumping laser beam L2 can be recombined collinearly and overlapped in time and space to form a coherent spectro-microscopic laser beam L3. The optical path folding elements 261 can be configured for folding an optical path of the coherent spectro-microscopic laser beam L3 recombined by the Stokes laser beam L1 and the pumping laser beam L2. In the 2nd embodiment, the number of the optical path folding elements 261 is three, but the present disclosure is not limited thereto.

Figure 4B:
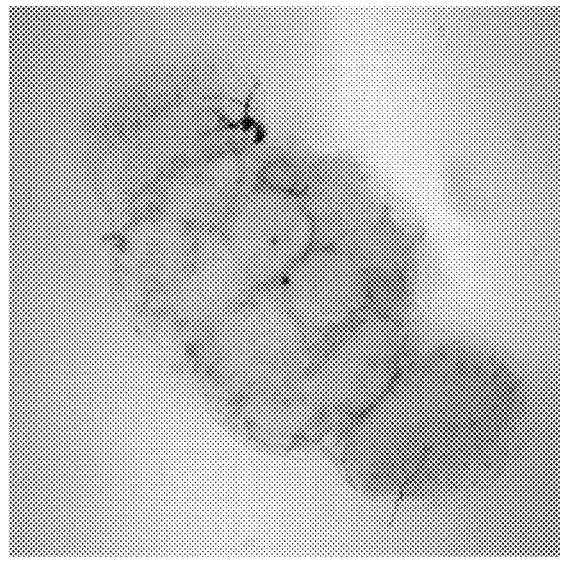
FIG. 4B shows a schematic view of a coherent anti-stokes Raman spectro-microscopy (CARS) image of the sample generated by a CARS measuring module according to the 2nd embodiment in FIG. 3.
Figure 4A:
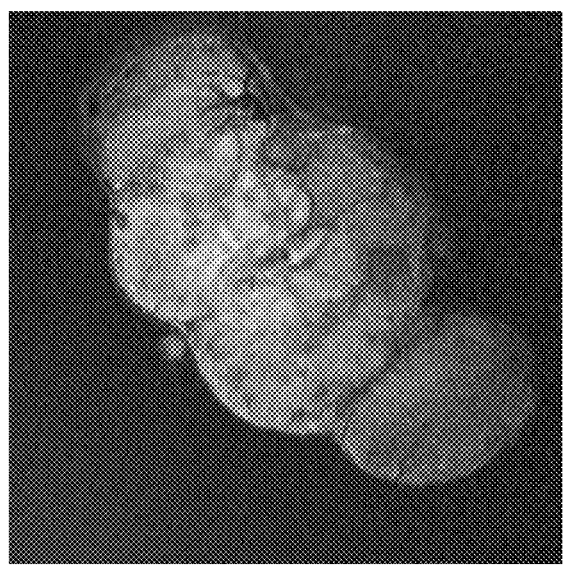
FIG. 4A shows a schematic view of a stimulated Raman scattering (SRS) image of the sample generated by an SRS measuring module according to the 2nd embodiment in FIG. 3.

FIG. 4A shows a schematic view of a stimulated Raman scattering (SRS) image of the sample S generated by an SRS measuring module 242 according to the 2nd embodiment in FIG. 3. FIG. 4B shows a schematic view of a coherent anti-stokes Raman spectro-microscopy (CARS) image of the sample S generated by a CARS measuring module 243 according to the 2nd embodiment in FIG. 3. In the 2nd embodiment, the spectro-microscopic assembly can include a spectro-microscopic lens assembly 241, the SRS measuring module 242, the CARS measuring module 243, and a coherent anti-stokes dichroic mirror 244. The spectro-microscopic image of the sample S can include the SRS image and the CARS image. Specifically, the sample S can be a brain of a *Drosophila melanogaster*. The sample S is disposed in the spectro-microscopic lens assembly 241, and the spectro-microscopic lens assembly 241 receives the coherent spectro-microscopic laser beam L3 so that the coherent spectro-microscopic laser beam L3 passes through the sample S. As shown in FIG. 4A, the SRS measuring module 242 receives the coherent spectro-microscopic laser beam L3 passing through the sample S and generate the SRS image of the sample S. Moreover, when the coherent spectro-microscopic laser beam L3 passes through the sample S, the sample S generates a coherent spectro-microscopic laser beam along the direction of the coherent spectro-microscopic laser beam L3 passing through the sample S. The coherent spectro-microscopic laser beam contains a newly generated anti-Stokes laser beam, the original incident Stokes laser beam L1 and the original pumping laser beam L2. The coherent spectro-microscopic laser beam is filtered by a color filtering film 2422 into the Stokes laser beam for image scanning. As shown in FIG. 4B, the coherent spectro-microscopic laser beam L3 passes through the sample S to generate an inference spectro-microscopic laser beam whose direction is opposite to the coherent spectro-microscopic laser beam L3 laser beam. The inference spectro-microscopic laser beam contains a newly generated anti-Stokes laser beam, the original incident Stokes laser beam L1 and parts of the original pumping laser beam L2. The coherent anti-stokes dichroic mirror 244 folds an optical path of the inference spectro-microscopic laser beam, and a color filtering film 2431 filters other laser beams and allows the anti-Stokes laser beam to pass therethrough to generate the CARS image of the sample S. It is necessary to be mentioned that the SRS measuring module 242 includes a reflecting mirror 2421, the color filtering film 2422, a focusing lens element 2423, a photodiode 2424 and a lock-in amplifier 2425. The CARS measuring module 243 includes the color filtering film 2431 and a photomultiplier tube (PMT) sensor 2432, but the structural details are not the major features of the present disclosure and are not described herein. Therefore, the SRS image which removes non-resonance background noises, and the CARS image can be provided to improve the resolution of the spectro-microscopic image.

Figure 5:
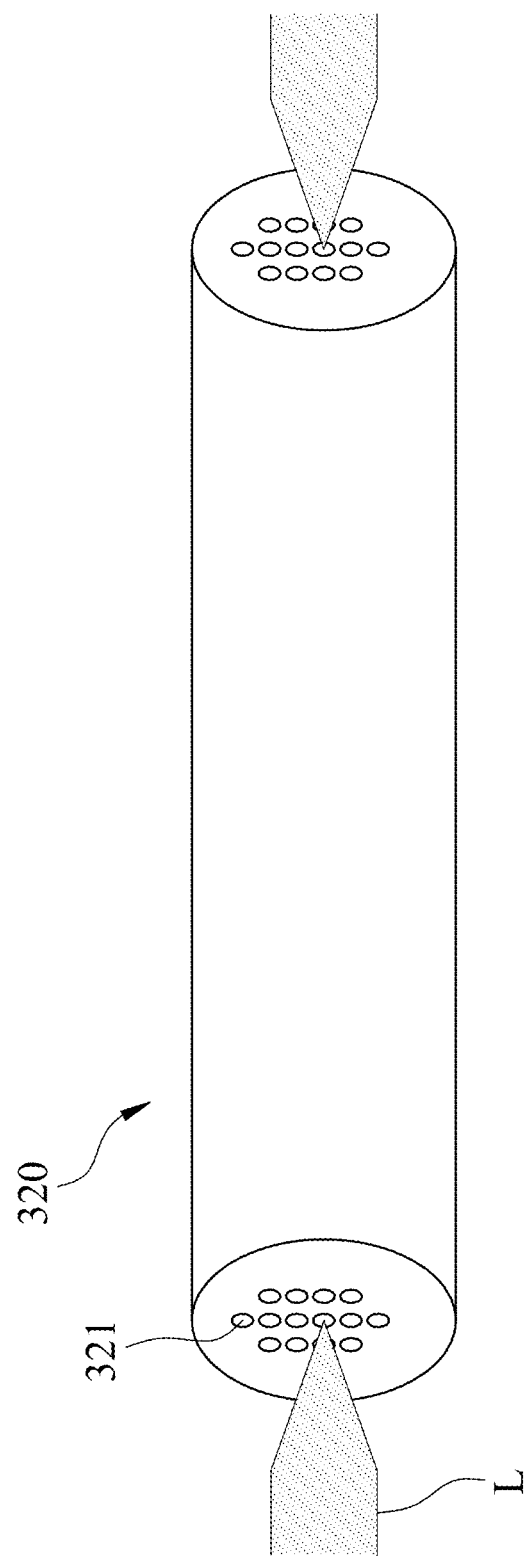
FIG. 5 shows a schematic view of a supercontinuum spectrum generator of a coherent Raman spectro-microscopy system according to the 3rd embodiment of the present disclosure.

FIG. 5 shows a schematic view of a supercontinuum spectrum generator 320 of a coherent Raman spectro-microscopy system according to the 3rd embodiment of the present disclosure. In the 3rd embodiment, the structures and configurations of the light source, the color filter assembly and the spectro-microscopic assembly can be the same as the structures and configurations of the light source 110, the color filter assembly and the spectro-microscopic assembly of the 1st embodiment or the light source 210, the color filter assembly and the spectro-microscopic assembly of the 2nd embodiment and will not be described herein. It is worthy to mention that the supercontinuum spectrum generator 320 in the 3rd embodiment can be a photonic crystal fiber. The cross-section of the photonic crystal fiber is made of a plurality of optical fiber micro-structures 321, and a pulsed laser beam L travels in the optical fiber micro-structures 321 to broaden the bandwidth of the pulsed laser beam L. With the optical fiber micro-structures 321 in the photonic crystals of the fiber, the bandwidth of the pulsed laser beam L can be broadened nonlinearly to provide pulsed laser beam L with a wide bandwidth for the following measurement of the coherent Raman spectro-microscopy system.

Figure 6:
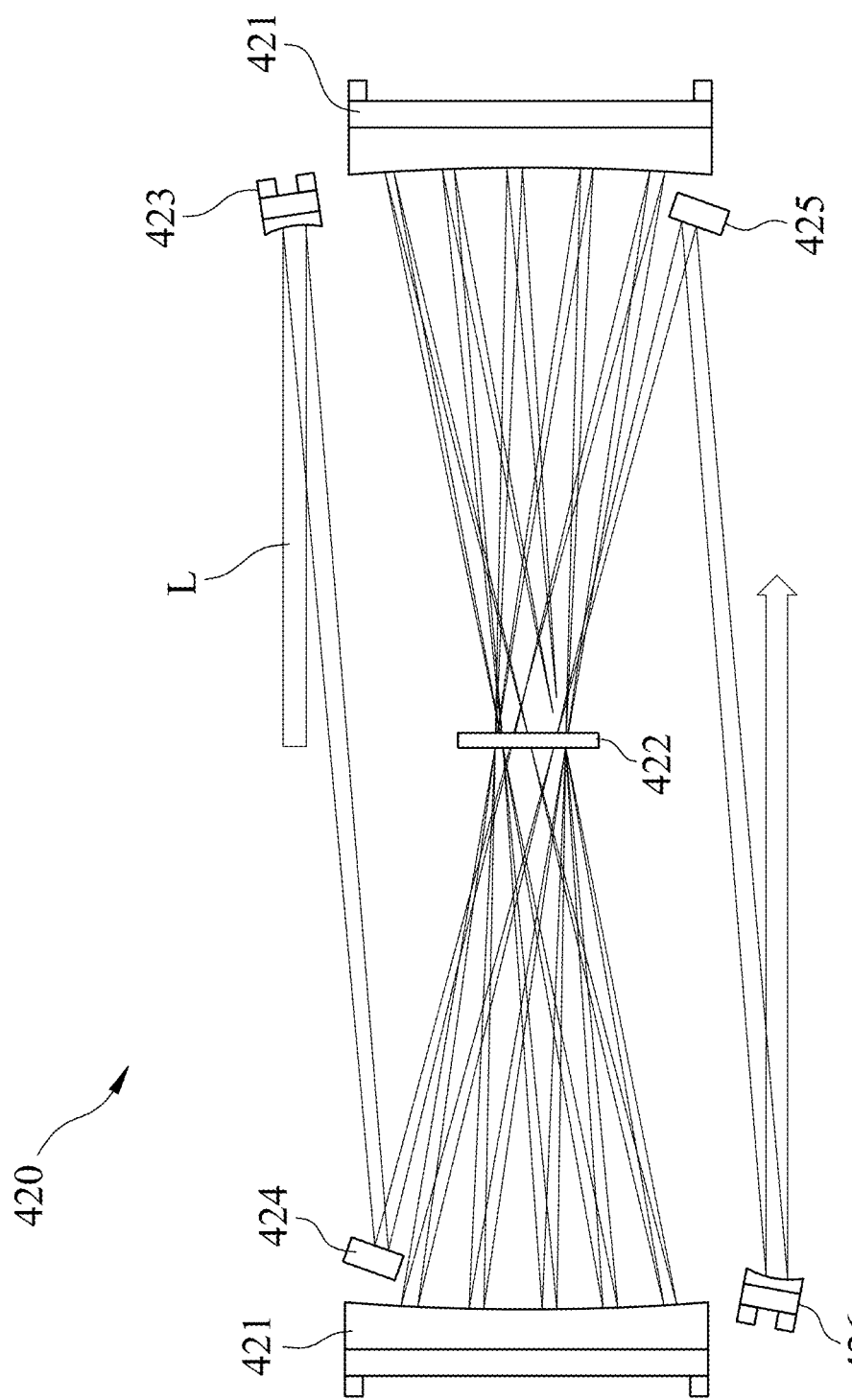
FIG. 6 shows a schematic view of a supercontinuum spectrum generator of a coherent Raman spectro-microscopy system according to the 4th embodiment of the present disclosure.

FIG. 6 shows a schematic view of a supercontinuum spectrum generator 420 of a coherent Raman spectro-microscopy system according to the 4th embodiment of the present disclosure. In the 4th embodiment, the structures and configurations of a light source, a color filter assembly, and a spectro-microscopic assembly can be the same as the structures and configurations of the light source 110, the color filter assembly, and the spectro-microscopic assembly of the 1st embodiment or the light source 210, the color filter assembly and the spectro-microscopic assembly of the 2nd embodiment and will not be described herein again. It is worthy to mention that the supercontinuum spectrum generator 420 in the 4th embodiment can include two reflecting-and-focusing elements 421, a non-linear medium 422, two concave mirrors 423, 426 and two flat mirrors 424, 425. The two reflecting-and-focusing elements 421 are for reflecting a pulsed laser beam L. Specifically, the non-linear medium 422 can be a gaseous medium or a solid medium element, but the present disclosure is not limited thereto. The non-linear medium 422 is disposed between the two reflecting-and-focusing elements 421. The two reflecting-and-focusing elements 421 reflect the pulsed laser beam L to form a zigzag optical path, and the zigzag optical path passes through the non-linear medium 422 to broaden the bandwidth of the pulsed laser beam L. In detail, the pulsed laser beam L is reflected by the concave mirror 423 and the flat mirror 424 first, then passes through and is broadened by the non-linear medium 422, then the pulsed laser beam L is reflected by one of the reflecting-and-focusing elements 421 and passes through the non-linear medium 422, and then reflected by the other one of the reflecting-and-focusing elements 421 and passes through the non-linear medium 422 again. After the pulsed laser beam L is reflected by the reflecting-and-focusing elements 421 and passes through the non-linear medium 422 lots of times, the pulsed laser beam L is reflected by the flat mirror 425 and the concave mirror 426 and passes through the other elements of the coherent Raman spectro-microscopy system for the following measurement. Therefore, the laser beam can be broadened by a multi-pass cell for providing the pulsed laser beam L with the wide bandwidth.

Figure 7:
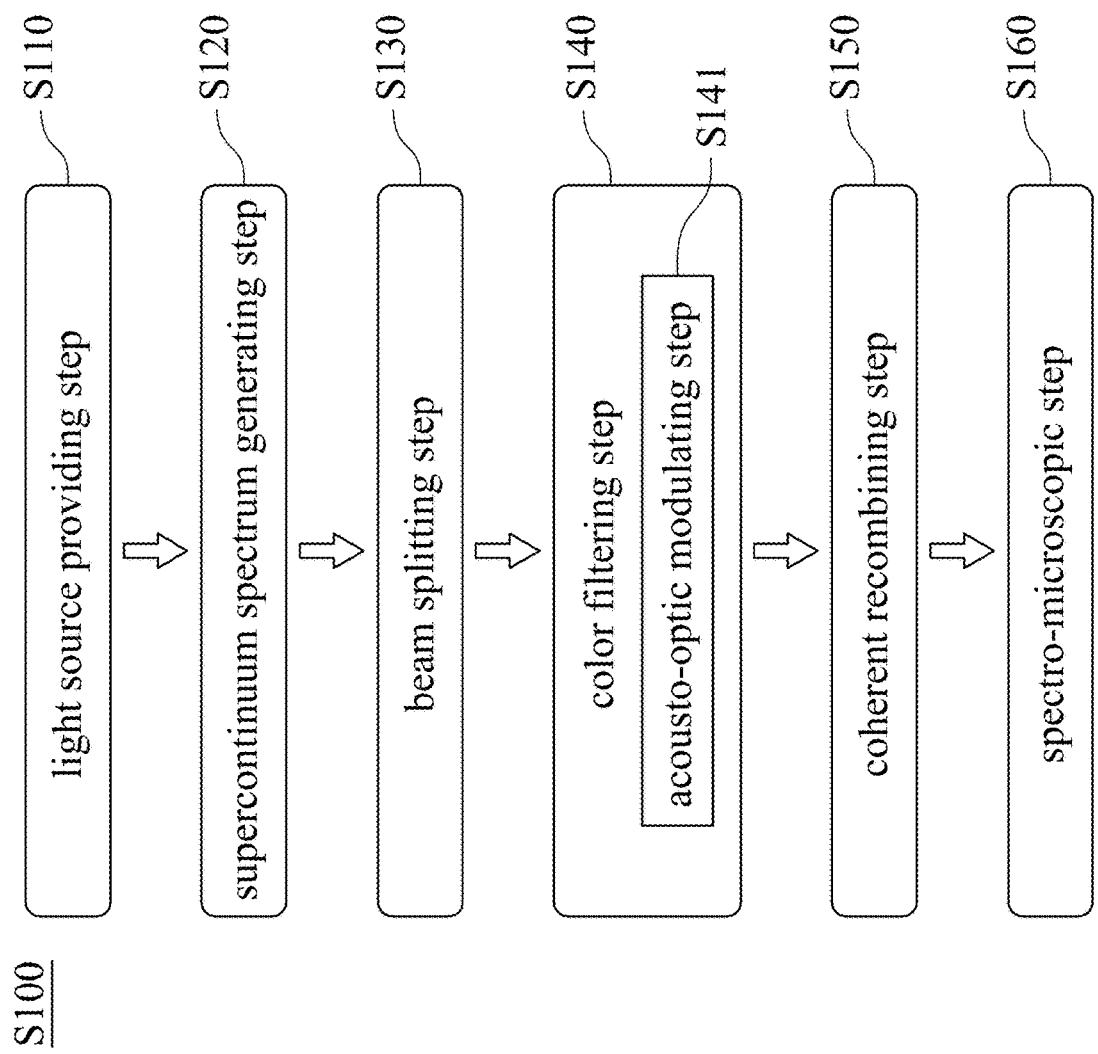
FIG. 7 shows a block diagram of a coherent Raman spectro-microscopy method according to the 5th embodiment of the present disclosure.

FIG. 7 shows a block diagram of a coherent Raman spectro-microscopy method S100 according to the 5th embodiment of the present disclosure. The coherent Raman spectro-microscopy method S100 will be described with the coherent Raman spectro-microscopy system 100 of the 1st embodiment in the following descriptions, but the present disclosure is not limited thereto. The coherent Raman spectro-microscopy method S100 is configured for generating a spectro-microscopic image of a sample S and includes a light source providing step S110, a supercontinuum spectrum generating step S120, a color filtering step S140 and a spectro-microscopic step S160. The light source providing step S110 is performed to provide at least one pulsed laser beam L. The supercontinuum spectrum generating step S120 is performed to broaden a bandwidth of the pulsed laser beam L. The color filtering step S140 is performed to filter the bandwidth of the pulsed laser beam L according to a predetermined bandwidth and to convert the pulsed laser beam L into a coherent spectro-microscopic laser beam L3. The spectro-microscopic step S160 is performed to guide the coherent spectro-microscopic laser beam L3 through the sample S and to generate the spectro-microscopic image of the sample S. By filtering the broadened pulsed laser beam L, a frequency difference of the pulsed laser beam L can be adjusted according to the molecular fingerprint of the sample S to improve the convenience of adjusting the bandwidth and the stability of measuring the sample S.

As shown in FIG. 7, the coherent Raman spectro-microscopy method S100 can further include a beam splitting step S130 and a coherent recombining step S150. The beam splitting step S130 is performed to split the pulsed laser beam L into a Stokes laser beam L1 and a pumping laser beam L2 according to predetermined wavelengths. Furthermore, after splitting the pulsed laser beam L in the beam splitting step S130, in the color filtering step S140, the wavelength band of the Stokes laser beam L1 is filtered according to a first predetermined band, and the band of the pumping laser beam L2 is filtered according to a second predetermined band, after which the coherent recombining step S150 is performed. The coherent recombining step S150 is performed to recombine the Stokes laser beam L1 filtered according to the first predetermined band and the pumping laser beam L2 filtered according to the second predetermined band into the coherent spectro-microscopic laser beam L3. Therefore, a light source of this kind laser beam can adjust the bandwidths and central wavelengths of the Stokes laser beam L1 and the pumping laser beam L2, respectively, such that a frequency difference between the Stokes laser beam L1 and the pumping laser beam L2 can be less than 1000 $cm^{-1}$ to improve the accuracy and stability of the measurement.

Moreover, the color filtering step S140 can include an acousto-optic modulating step S141. The acousto-optic modulating step S141 is performed to modulate the intensity of the Stokes laser beam L1 or the intensity of the pumping laser beam L2 according to a predetermined modulation frequency and to extract the pumping laser beam L2 or the Stokes laser beam L1 by an acousto-optic modulator 170. Therefore, the Stokes laser beam L1 or the pumping laser beam L2 can be modulated according to the molecular fingerprint of the sample S to decrease the interference of environmental noise, and then the convenience of measuring can be improved.

Specifically, in the supercontinuum spectrum generating step S120, the bandwidth of the pulsed laser beam L is broadened by a plurality of broadening plates 121, and the number of the broadening plates 121 is at least two. In other embodiments, in the supercontinuum spectrum generating step, a zigzag optical path of the pulsed laser beam is formed by two reflecting-and-focusing elements, and the pulsed laser beam passes through a non-linear medium to broaden the bandwidth of the pulsed laser beam; or, the pulsed laser beam travels in a plurality of optical fiber micro-structures of a photonic crystal fiber to broaden the bandwidth of the pulsed laser beam, but the supercontinuum spectrum generating step of the present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A coherent Raman spectro-microscopy system, configured for generating a spectro-microscopic image of a sample, and comprising:
a light source for emitting at least one pulsed laser beam;
a supercontinuum spectrum generator for broadening a bandwidth of the at least one pulsed laser beam;
a color filter assembly for filtering the bandwidth of at least one pulsed laser beam according to a predetermined bandwidth and converting the at least one pulsed laser beam into a coherent spectro-microscopic laser beam; and
a spectro-microscopic assembly, wherein the sample is disposed in the spectro-microscopic assembly, and the spectro-microscopic assembly receives the coherent spectro-microscopic laser beam so that the coherent spectro-microscopic laser beam passes through the sample to generate the spectro-microscopic image of the sample;
wherein the color filtering assembly comprises:
a beam splitter for splitting the at least one pulsed laser beam into a Stokes laser beam and a pumping laser beam;
at least one color filter filtering a bandwidth of at least one of the Stokes laser beam and the pumping laser beam; and
a light recombining element disposed between the at least one color filter and the spectro-microscopic assembly, and the light recombining element for recombining the Stokes laser beam and the pumping laser beam into the coherent spectro-microscopic laser beam, wherein the coherent spectro-microscopic laser beam passes through the sample, and the spectro-microscopic assembly generates the spectro-microscopic image of the sample according to a frequency difference of the coherent spectro-microscopic laser beam.

2. The coherent Raman spectro-microscopy system of claim 1, wherein the supercontinuum spectrum generator comprises:
two reflecting-and-focusing elements for reflecting the at least one pulsed laser beam; and a non-linear medium disposed between the two reflecting-and-focusing elements, wherein the two reflecting-and-focusing elements reflect the at least one pulsed laser beam to form a zigzag optical path, and the zigzag optical path passes through the non-linear medium to broaden the bandwidth of the at least one pulsed laser beam.

3. The coherent Raman spectro-microscopy system of claim 1, wherein the supercontinuum spectrum generator is a photonic crystal fiber, a cross-section of the photonic crystal fiber is made of a plurality of optical fiber micro-structures, and the at least one pulsed laser beam travels in the optical fiber micro-structures to broaden the bandwidth of the at least one laser beam.

4. The coherent Raman spectro-microscopy system of claim 1, wherein a pulse duration of the at least one pulsed laser beam emitted by the light source is less than one picosecond.

5. The coherent Raman spectro-microscopy system of claim 1, wherein a number of the at least one color filter is at least two, one of the at least two color filters is for filtering the bandwidth of the Stokes laser beam according to a first predetermined band, and another one of the at least two color filters is for filtering the bandwidth of the pumping laser beam according to a second predetermined band.

6. The coherent Raman spectro-microscopy system of claim 5, wherein the color filtering assembly further comprises:
an acousto-optic modulator for modulating an intensity of the Stokes laser beam or an intensity of the pumping laser beam according to a predetermined modulation frequency and extracting the pumping laser beam or the Stokes laser beam according to the predetermined modulation frequency.

7. The coherent Raman spectro-microscopy system of claim 5, wherein each of the at least two color filters is a tunable filter, a determined frequency color filter, or a dichroic mirror.

8. The coherent Raman spectro-microscopy system of claim 1, wherein the supercontinuum spectrum generator comprises:
a plurality of broadening plates arranged in order along an optical path of the at least one pulsed laser beam, and the broadening plates broadening the bandwidth of the at least one pulsed laser beam sequentially.

9. The coherent Raman spectro-microscopy system of claim 8, wherein the supercontinuum spectrum generator further comprises:
at least two focusing elements, wherein the broadening plates are disposed between the at least two focusing elements, and the at least two focusing elements are for focusing the at least one pulsed laser beam.

10. The coherent Raman spectro-microscopy system of claim 5, wherein a number of the broadening plates is at least two.

11. A coherent Raman spectro-microscopy method, configured for generating a spectro-microscopic image of a sample, and comprising:

a light source providing step performed to provide at least one pulsed laser beam;
a supercontinuum spectrum generating step performed to broaden a bandwidth of the at least one pulsed laser beam;
a color filtering step performed to filter the bandwidth of the at least one pulsed laser beam according to a predetermined bandwidth and to convert the at least one pulsed laser beam into a coherent spectro-microscopic laser beam; and
a spectro-microscopic step performed to guide the coherent spectro-microscopic laser beam through the sample and to generate the spectro-microscopic image of the sample;
wherein the coherent Raman spectro-microscopy method further comprises a beam splitting step performed to split the at least one pulsed laser beam into a Stokes laser beam and a pumping laser beam;
wherein in the color filtering step, a bandwidth of the Stokes laser beam is filtered according to a first predetermined band, and a bandwidth of the pumping laser beam is filtered according to a second predetermined band.

12. The coherent Raman spectro-microscopy method of claim 11, wherein the color filtering step comprises:
an acousto-optic modulating step performed to modulate an intensity of the Stokes laser beam or an intensity of the pumping laser beam according to a predetermined modulation frequency and to extract the pumping laser beam or the Stokes laser beam by an acousto-optic modulator.

13. The coherent Raman spectro-microscopy method of claim 11, further comprising:
a coherent recombining step performed to recombine the Stokes laser beam filtered according to the first predetermined band and the pumping laser beam filtered according to the second predetermined band into the coherent spectro-microscopic laser beam.

14. The coherent Raman spectro-microscopy method of claim 11, wherein, in the supercontinuum spectrum generating step, a zigzag optical path of the at least one pulsed laser beam is formed by two reflecting-and-focusing elements, and the zigzag optical path passes through a non-linear medium to broaden the bandwidth of the at least one pulsed laser beam.

15. The coherent Raman spectro-microscopy method of claim 11, wherein, in the supercontinuum spectrum generating step, the at least one pulsed laser beam travels in a plurality of optical fiber micro-structures of a photonic crystal fiber to broaden the bandwidth of the at least one pulsed laser beam.

16. The coherent Raman spectro-microscopy method of claim 11, wherein, in the supercontinuum spectrum generating step, the bandwidth of the at least one pulsed laser beam is broadened by a plurality of broadening plates.

17. The coherent Raman spectro-microscopy method of claim 16, wherein a number of the broadening plates is at least two.

* * * * *